(12) United States Patent
Liu et al.

(10) Patent No.: US 11,078,223 B2
(45) Date of Patent: Aug. 3, 2021

(54) COMPOSITE PHOSPHORUS FLAME RETARDANT COMPRISING CYCLIC ORGANOPHOSPHATE WITH MULTIPLE DOPO MOIETIES AND PREPARATION METHOD THEREOF

(71) Applicant: HUAIAN LINGCHUANG LEADER NEW MATERIALS CO., LTD., Jiangsu (CN)

(72) Inventors: Changkun Liu, Jiangsu (CN); Hongliang Zheng, Jiangsu (CN)

(73) Assignee: HUAIAN LINGCHUANG LEADER NEW MATERIALS CO., LTD.

( * ) Notice: Subject to any disclaimer, the term of this patent is extended or adjusted under 35 U.S.C. 154(b) by 401 days.

(21) Appl. No.: 16/071,083

(22) PCT Filed: Jul. 5, 2016

(86) PCT No.: PCT/CN2016/088521
§ 371 (c)(1),
(2) Date: Jul. 19, 2018

(87) PCT Pub. No.: WO2017/193463
PCT Pub. Date: Nov. 16, 2017

(65) Prior Publication Data
US 2020/0361971 A1    Nov. 19, 2020

(30) Foreign Application Priority Data
May 10, 2016 (CN) .......................... 201610304553.5

(51) Int. Cl.
*C09K 21/14* (2006.01)
*C07F 9/02* (2006.01)
*C07F 9/6574* (2006.01)
*C09K 21/12* (2006.01)

(52) U.S. Cl.
CPC .......... *C07F 9/65746* (2013.01); *C09K 21/12* (2013.01)

(58) Field of Classification Search
CPC ................................. C09K 21/14; C07F 9/02
See application file for complete search history.

(56) References Cited

FOREIGN PATENT DOCUMENTS

CN            105384858       *   3/2016

* cited by examiner

Primary Examiner — John S Kenyon

(57) ABSTRACT

The present invention discloses a composite phosphorus flame retardant comprising cyclic organophosphate with multiple DOPO moieties, and a manufacturing method thereof. The composite structure phosphorus flame retardant has a structural formula comprising at least one organophosphate and at least two DOPO cyclic organophosphates. The method comprises: mixing the DOPO with a polyhydroxy alkane or a hydrocarbon substituent, wherein the polyhydroxy alkane has at least three hydroxy groups, and the hydrocarbon substituent has a chain with at least three carbon atoms; heating the mixture to 195-210° C. and reacting for 14-17 hours in the presence of a protective gas, and then cooling to room temperature; adding a phosphorus oxohalide or an incompletely esterified phosphorus oxohalide; and heating to 55-65° C. and reacting for 1.5-3 hours, then cooling to room temperature to obtain the product. The invention provides flame retardation at two decomposition temperatures, the first occurring within a range of 230-310° C., while the other occurring after 345° C. The in has a simple composition, is easy to use, has high phosphorus contents, and provides improved flame retardance.

3 Claims, 1 Drawing Sheet

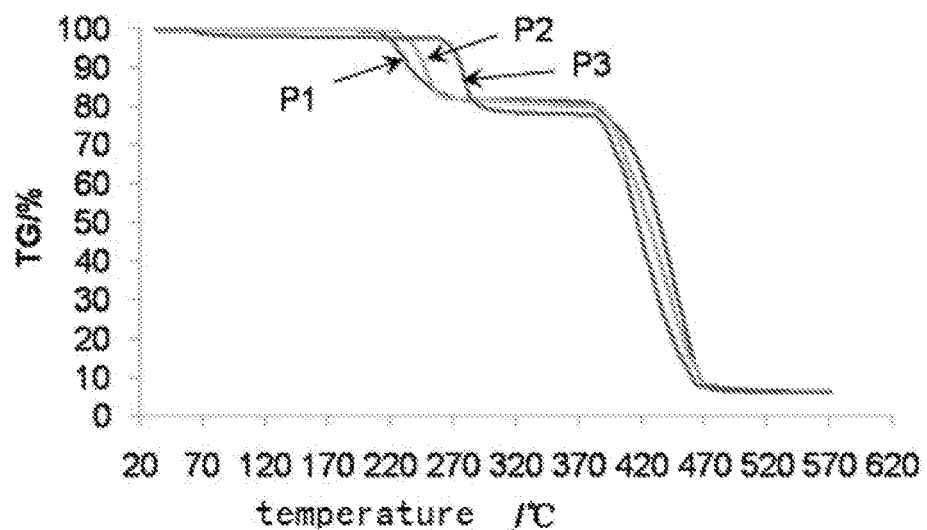

COMPOSITE PHOSPHORUS FLAME RETARDANT COMPRISING CYCLIC ORGANOPHOSPATE WITH MULTIPLE DOPO MOIETIES AND PREPARATION METHOD THEREOF

FIELD

The invention relates to the technical field of flame retardants, particularly to a composite phosphorus flame retardant comprising cyclic organophosphate with multiple DOPO moieties, and a manufacturing method thereof.

BACKGROUND

In the traditional flame retardant, the bromine flame retardants, with the advantages of good flame retardant effect, little effect on the performance of flame-retardant polymers and high cost performance, are widely applied. But the bromine flame retardants are not environmental-friendly, and may produce harmful carcinogen (dioxin) and lots of harmful smoke in flame retardance, so EU RoHS laws prohibit using harmful substances, such as polybrominated diphenyl ethers, in electrical and electronic equipment. Some states of USA also launched similar laws. At the same time, some transnational corporations also worked out respective environmental protection standards, and the requirement for restriction on use of halogen is tire important content therein. In 2007, the draft standard proposed by Association Connecting Electronics Industries (IPC) suggests that "halogen-free/low halogen" is implemented in tire whole electronics industry. It can be predicted that the global "halogen-free/low halogen" requirements will cause a new revolution for the flame retardants applied to electronic products. While the phosphate flame retardant, with the characteristics of no halogen, low toxicity and high efficiency, is regarded as the ideal substitute product of the bromine flame retardant.

In 2010, the using amount of the global organophosphorus (excluding P-X system) flame retardants is about 18,0000 ton, and the organophosphorus flame retardants are widely applied to engineering plastic and polyurethane foam plastic. With acceleration of the halogen-free process of the flame retardants, the annual growth rate of the annual consumption volume will be higher than that of the total amount of flame retardants. Most of the existing organophosphorus flame retardants are alkane or aromatic phosphate compounds, such as BDP (bispheriol A tetraphenyl diphosphate oligomer), with the disadvantages of low decomposition temperature, high volatility and hydrolization (water solubility), and easy transfer in the machining process, so the ornanophosphorus flame retardants can be applied to general plastic with low machining temperature only, and the flame retard efficiency is unsatisfactory. These disadvantages limit the application of the common organo-phosphorus flame retardants, so novel organophosphorus flame retardants need to be produced.

DOPO derivative compounds have unique structures of the cyclic organophosphate; compared with common alkane and aromatic phosphates, the decomposition temperature of the DOPO derivative compounds is high, so the DOPO derivative compounds are applied to polyester and polyether matrix with high machining temperature. If the DOPO derivative compounds are used together with other flame retardants with low decomposition temperature, the flame retardant effect is better. The DOPO derivative compounds are divided into addition type and reaction type in the using process. For the addition type DOPO flame retardant, DOPO reacts to small molecule compounds generally to obtain new compounds containing DOPO structures, and the compounds of this type as the flame retardant additives are added to substrates. The Chinese patent application CN201080022027.0 (WO 2010135398) discloses a typical addition type DOPO derivative flame retardant 6H-dibenzoanthracene [c,e] [1,2] oxyphosphorus hexane, 6,6'-(1,4-ethane dibutyl) dual-6,6'-dioxode (DIDOPO), and the decomposition temperature of 1% mass loss at the beginning is 348° C. and that of 5% mass loss is 382° C. For phenolic varnish epoxy layers and sheets, DIDOPO is added till the phosphorus content is 3%, and then the UL-94 V-1 flame-retardant standards are met. When DIDOPO is used by compounding silicon dioxide and/or melamine phosphate, and DIDOPO is added; then the V-0 flame-retardant standards can be met. Though the flame retardant has excellent performance, the wide application of the flame retardant is affected due to high molecular rigidity, poor compatibility with flame-retardant polymer matrix, and uneasy uniform dispersion in the polymer matrix.

For the reaction type DOPO derivative combustion improver, activated monomers containing DOPO structure units are obtained generally through compounding, and are embedded into polymer chains through polymerization or condensation reaction. CN201010206426.4 introduces a method for embedding DOPO into aromatic diglycol monomers. DE19522876 introduces the method of reaction of DOPO to itaconic acid or itaconic compounds, and application of the itaconic acid and the itaconic compounds in fire retardant polyester fibers. J. Appl. Poly. Sci. 78, 2000, 228-235 describes a method for preparing flame-retardant epoxy resin; affixture obtained through reaction of DOPO to maleic acid and itaconic acid, and then the affixture reacts to diepoxy glycerine or bisphenol A. Since the reaction type DOPO cyclic organophosphate structure is embedded into the matrix polymer molecule structure (main chain or side chain), with great influence on the physical properties (glass-transition temperature and tensile strength) of the polymer. Be careful in use.

SUMMARY

The invention aims to provide a composite phosphorus flame retardant comprising cyclic organophosphate with multiple DOPO moieties, with the advantages of easy compounding and use, high phosphorus content and good flame retardant effect, and a manufacturing method thereof so as to solve the problems proposed in the above background art.

In order to achieve the above proposes, the invention provides the following technical scheme: A composite phosphorus flame retardant comprising cyclic organophosphate with multiple DOPO moieties has a structural formula comprising at least one organophosphate and at least two DOPO cyclic organophosphates.

According to another aspect of the invention, the structure of the composite structure phosphorus flame retardant is shown in the structural formula (c), wherein at least one of $R_1$, $R_2$ or $R_3$ is one of a structural formula (a) or a structural formula (b), and thus the rest $R_1$, $R_2$ or $R_3$ is alkyl or aryl; R in the structural formula (a) or the structural formula (b) is hydrogen, alkyl, aryl, carboxyl, carboxyl aryl, hydroxyl alkyl, alkoxy alkyl, aryloxy alkyl, hydroxy aryl, alkoxy aryl or aryloxy aryl, and R is identical or different substituents, n, m, p and q are numbers 1-20;

(a)
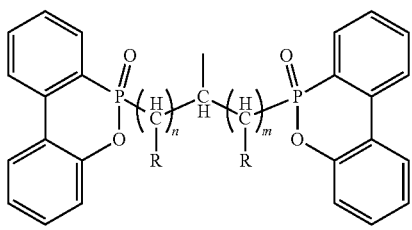

(a)
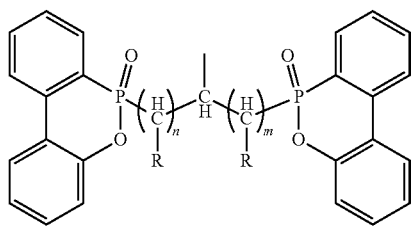

(b)
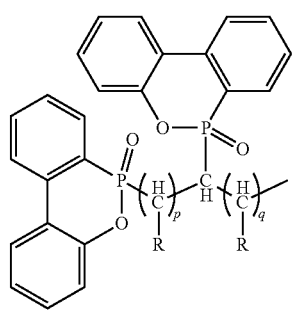

(b)
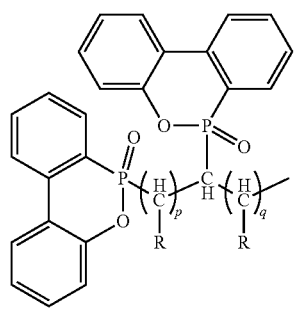

(c)
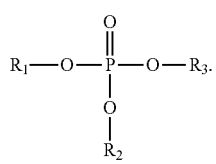

Wherein, R is hydrogen, alkyl, aryl, carboxyl, carboxyl aryl, hydroxyl alkyl, alkoxy alkyl, aryloxy alkyl, hydroxy aryl, alkoxy aryl or aryloxy aryl, and R is identical or different substituents; n, m, p and q are numbers 1-20.

According to another aspect of the invention: the mixture is heated to 60° C. and reacts for 2 hours in (2).

According to another aspect of the invention; in (1), the polyhydroxy alkane is formed by mixing paraxylene, 1,1-dual (3,4-dimethyl phenyl) ethane and an alcoholic solution containing sodium iodide, and the mass ratio of the paraxylene, the 1,1-dual (3,4-dimethyl phenyl) ethane and the alcoholic solution containing sodium iodide is 100-101:800:55-65.

According to another aspect of the invention: the mass molar ratio of the sodium iodide to alcohol in the alcoholic solution is 4.35:1 g/mol, and the alcohol is glycerol, butantriol or pentaerythritol.

According to another aspect of the invention: the phosphorus oxohalide is phosphorus oxychloride.

Compared with the prior art, the composite phosphorus flame retardant, provided by the invention has the beneficial effects:

1. The composite phosphorus flame retardant provided by the invention has a distinguishing feature that one molecule contains two phosphate structures, namely common phosphate and cyclic organophosphate, and the composite phosphorus flame retardant provides flame retardation at two decomposition temperatures, the first occurring within a range of 230-310° C., while the other occurring after 345° C. The flame retardant actually has the flame retardant effect of the composite flame retardant of the common phosphate and cyclic organophosphate.

Common phosphate structures and long chain hydrocarbon cyclic organophosphate structure (a chain with at least three carbon atoms) provide molecular relative flexibility, and high compatibility with polyether and polyester matrix.

3. The DODO cyclic organophosphate structure comprises multiple P—C winds so that high flame retardant efficiency of the DOPO cyclic organophosphate structure is ensured, and the DOPO cyclic organophosphate structure applies to the polymer matrix with high machining temperature.

The manufacturing method of the composite phosphorus flame retardant comprising cyclic organophosphate with multiple DOPO moieties comprises two steps:

(1) Mixing the DOPO with a polyhydroxy alkane or a hydrocarbon substituent, wherein the polyhydroxy alkane has at least three hydroxy groups, and the hydrocarbon substituent has a chain with at least three carbon atoms; heating the mixture to 195-210° C. and reacting for 14-17 hours in the presence of a protective gas, so that at least one hydroxy group therein does not participate in reaction, so as to obtain the DOPO cyclic organophosphate;

(2) Cooling to the room temperature, heating the phosphorus oxohalide or incompletely esterified phosphorus oxohalide to 55-65° C. and reacting for 1.5-3 hours, so that the phosphorus oxohalide or the incompletely esterified phosphorus oxohalide reacts to the hydroxyl group unreacted in the DOPO cyclic organophosphates, and cooling to the room temperature to obtain the composite phosphorus flame retardant.

According to another aspect of the invention: the protective gas is nitrogen gas in (1).

According to another aspect of the invention: the mixture is heated to 200° C. and reacts for 14 hours in the presence of the protective gas in (1), and then reacts for 2 hours at 205° C.

According to another aspect of the invention: The structure of the DOPO cyclic organophosphate includes but not limited to the structural formula (a) or the structural formula (b), 4. The invention provides the addition type halogen-free phosphorus flame retardant with the advantages of simple compounding, easy use, high phosphorus content and good flame retardant effect.

The flame retardant provided by the invention is different from the DOPO derivative compound disclosed by the existing patent, the cyclic organophosphate structures with multiple DOPO moieties connected through carbon-carbon bonds are subjected to condensation into a compound molecule through common phosphate in the composite structure.

BRIEF DESCRIPTION OF THE DRAWINGS

FIG. 1 is a drawing of the test results in the embodiment 4 of the invention.

DETAILED DESCRIPTION

The following is a clear and detailed description of the technical scheme in the embodiment of the invention by illustrating the embodiments of the invention, obviously, the described embodiments are a part of the embodiments of the invention other than all embodiments. Based on the embodiments of the invention, all other embodiments made by common technical personnel in this field without creative work belong to the protection scope of the invention.

Embodiment 1

A mechanical agitator, an h-shaped oil-water separator, a reflux condenser pipe, a dropping funnel and a nitrogen gas inlet are installed on a 3 L four-neck flask. 253.3 (1.172 mol) of DOPO (9,10-dihydro-9-oxa-10-phosphaphenanthrene-10-oxide), 100.6 g of paraxylene, 800 g of PXE (1,1-dual (3,4-dimethyl phenyl)ethane) solvents and 56.45 g of propanediol solution (53.9 g (0.586 mol) propanediol solution dissolving 2.55 g of sodium iodide) are added to the flask. After the paraxylene is added to the oil-water separator fully, the reaction mixture is heated to 200° C. and, reacts for 14 hours under the protection of nitrogen flow, and the oil-water separator continuously discharges water produced in the reaction process. The water produced in the later period of the reaction is less, then the reaction temperature increases to 205° C., and the mixture reacts for 2 hours. Upon completion of reaction, after the system temperature decreases to the room temperature, 29.94 g (0.195 mol) of phosphorus oxychloride is added with the dropping funnel dropwise; hydrogen chloride gas generated in the reaction is neutralized and absorbed by 20% NaOH solutions; after the phosphorus oxychloride is added, the reaction temperature increases to 60° C., and then the mixture reacts for 2 hours; after the reaction mixture is cooled to the room temperature, the products precipitate out of the solvents as white to canary yellow waxy solid, and the product marking is P1. The production yield (based on DOPO raw materials) is 85%, and the phosphorus content is 14.36%. 1HNMR: 7.15-7.95 ppm, in, 16H(H—Ar); 2.87 ppm, d, 4H (CH2); 3.60 ppm, m, 1H(CH). 13CNMR: 119.9-150.2 ppm(C—Ar); 39.2 ppm (CH$_2$); 50.1 ppm (CH). 31PNMR: 37.14-37.34 ppm (DOPO chirals); −5.8 ppm ((—O—3P(O)).

Embodiment 2

According to the procedures of the embodiment 1, 56.45 g of propanediol solution in the reactants is replaced with 64.67 g of butantriol solution (62.12 g of 1,2,4-butanniol solution dissolving 2.55 g of sodium iodide), and the using amounts of other reactants and solvents are unchanged. After the reaction mixture is cooled to the room temperature, and before the phosphorus oxychloride is added dropwise, 150 ml of pyridine is added to the reaction flask firstly. The reaction product is canary yellow syrup liquid, with the marking of P2, the yield of 81% or so, and the phosphorus content of 13.98%. 1HNMR: 7.13-7.95 ppm,m,16 H(H—Ar); 2.60-2.88-ppm,m,6 H (CH2); 3.54 ppm,m,1 H(CH). 13CNMR: 119.9-150.2 ppm(C—Ar); 38.8-39.3 ppm (CH2); 50.1 ppm (CH). 31PNMR: 37.12-37.34 ppm (DOPO chiral isomer mixtures); −5.8 ppm (('O—)3P(O)).

Embodiments 3

53.13 g (0.391 mol) of pentaerythritol is dissolved in 160 ml of ethyl alcohol, and 2.55 g of sodium iodide is added to the ethyl alcohol; the mixture is heated for 2 hours, and then the ethyl alcohol is evaporated gradually to obtain the reaction mixture of the pentaerythritol and the sodium iodide. The propanetriol solution in the embodiment 1 is replaced with the mixture as the reactants, and the using amount of the reactants and the solvents are unchanged; the mixture reacts according to the procedures of the embodiment 1. After the reaction mixture is cooled to the room temperature, and before the phosphorus oxychloride is added dropwise, 150 ml of pyridine is added to the reaction flask firstly. The product is white solid, with the marking of P3, the yield of 86%, and the phosphorus content of 13.84%. 1HNMR: 7.29-8.02 ppm,m,24H(H—Ar); 2.42 ppm, s, 6H (P—CH2-C); 3.89 ppm, s, 2H(C—CH2-O). 13CNMR: 119.9-150.2 ppm(C—Ar); 39.7 ppm (CH2); 69.0 ppm (CH2), −4.8 ppm (tert-C). 31PNMR: 37.12-37.34 ppm (DOPO chiral isomer mixtures); −5.6 ppm ((—O—)3P(O)).

Embodiment 4

The flame retardants P1, P2 and P3 prepared in the embodiments 1-3 are subjected to thermogravimetric analysis test. The test is taken on the Netzsch STA449F3A analyzer in air atmosphere, the test temperature range is 20-600° C., and the heating rate is 10° C./min. The structure is shown in FIG. 1.

Embodiment 5

Flammability test: A proper amount of flame retardants P1, P2 and P3 prepared in the embodiments 1-3, flame retardant aluminum hydroxide (1000 mesh, Shandong Branch of Aluminum Corporation of China Limited) and 40 g of epoxy resin E-44 are mixed for 1 hour at 150° C., and then cooled to 100° C.; 7.5 g of diaminodiphenylmethane is added; the mixture is quickly cast into a mould with the dimensions of 10 cm×10 cm×3 mm (length×width×thickness) after being mixed evenly, solidified for 3 hours after the temperature is increased to 150° C., naturally cooled to the room temperature, and demoulded to obtain flame retardant epoxy resin samples to be tested. The limit oxygen index of the samples is measured with an oxygen index instrument, and the flammability level is measured with a vertical flammability tester; the results are shown in Table 1.

TABLE 1

| Test No. | Flame retardant | wt % of flame retardant[a] | wt % of phosphorus[a] | wt % of aluminum hydroxide[a] | Limit oxygen index[b] | UL94 flame rating |
|---|---|---|---|---|---|---|
| 1 | P1 | 10.4 | 1.5 | 0 | 29.0 | V-1 |
| 2 | P1 | 17.4 | 2.5 | 0 | 32.5 | V-0 |
| 3 | P1 | 10.4 | 1.5 | 20.0 | 32.0 | V-0 |
| 4 | P2 | 10.7 | 1.5 | 0 | 28.5 | V-1 |
| 5 | P2 | 8.6 | 1.2 | 20.0 | 31.0 | V-0 |
| 6 | P3 | 10.8 | 1.5 | 0 | 29.0 | V-1 |
| 7 | P3 | 18.1 | 2.5 | 0 | 31.5 | V-0 |
| 8 | P3 | 10.8 | 1.5 | 20.0 | 32.0 | V-0 |

[a]The weight percentage refers to the proportion of additives to the epoxy resin by weight;
[b]Refer to GB/T2406-93 for the measurement of the limit oxygen index.

For the technical personnel in this field, it is obvious that the invention is not limited to the above details of the demonstrative embodiments, and under the condition of not deviating from the spirit or essential characteristics of the invention, the invention can be archived in other specific forms. Thus, for every point, the embodiments shall be regarded as demonstrative, and nonrestrictive, the scope of the invention is limited by the claims other than the above description; thus, the meaning of equivalent elements in the claims and all changes in the scope are included in the invention.

In addition, although the invention is described according to the embodiments, each embodiment does not only include one independent technical scheme the description method of the manual is just for clarity, and the technical personnel in this field shall regard the manual as a whole; the technical schemes of the embodiments can also be combined properly to form other embodiments that can be understood by the technical personnel in this field.

What is claimed is:

1. A preparation method of a composite phosphorus flame retardant comprising cyclic organophosphate with multiple DOPO moieties, comprising the following steps:
    installing a mechanical agitator, an h-shaped oil-water separator, a reflux condenser pipe, a dropping funnel and a nitrogen gas inlet are installed on a 3 L four-neck flask,
    adding 253.3 g (1.172 mol) of DOPO which is 10-dihydro-9-oxa-10-phosphaphenanthrene-10-oxide, 100.6 g of paraxylene, 800 g of 1,1-dual(3,4-dimethyl phenyl)ethane solvents and 56.45 g of propanediol solution to the flask,
    after the paraxylene is added to the oil-water separator fully, heating reaction mixture to 200° C. and reacting for 14 hours under protection of nitrogen flow, wherein the oil-water separator continuously discharges water produced in reaction process,
    upon completion of reaction, after system temperature decreases to a room temperature, adding 29.94 g of phosphorus oxychloride with a dropping funnel dropwise, wherein hydrogen chloride gas generated in reaction is neutralized and absorbed by 20% NaOH solutions,
    after the phosphorus oxychloride is added, increasing reaction temperature to 60° C., and then reacting for 2 hours,
    wherein, after reaction mixture is cooled to the room temperature, a product P1 is precipitate out, which is the composite phosphorus flame retardant comprising cyclic organophosphate with multiple DOPO moieties.

2. A preparation method of a composite phosphorus flame retardant comprising cyclic organophosphate with multiple DOPO moieties, comprising the following steps:
    installing a mechanical agitator, an h-shaped oil-water separator, a reflux condenser pipe, a dropping funnel and a nitrogen gas inlet are installed on a 3 L four-neck flask,
    adding 253.3 g (1.172 mol) of DOPO which is 10-dihydro-9-oxa-10-phosphaphenanthrene-10-oxide, 100.6 g of paraxylene, 800 g of 1,1-dual(3,4-dimethyl phenyl)ethane solvents and 64.67 g of butantriol solution to the flask,
    after the paraxylene is added to the oil-water separator fully, heating reaction mixture to 200'C and reacting for 14 hours under protection of nitrogen flow, wherein the oil-water separator continuously discharges water produced in reaction process,
    upon completion of reaction, after system temperature decreases to a room temperature, adding 150 ml of pyridine, and then adding 29.94 g of phosphorus oxychloride with a dropping funnel dropwise, wherein hydrogen chloride gas generated in reaction is neutralized and absorbed by 20% NaOH solutions,
    after the phosphorus oxychloride is added, increasing reaction temperature to 60 T, and then reacting for 2 hours,
    wherein, after reaction mixture is cooled to the room temperature, a product P2 is precipitate out, which is the composite phosphorus flame retardant comprising cyclic organophosphate with multiple DOPO moieties.

3. A preparation method of a composite phosphorus flame retardant comprising cyclic organophosphate with multiple DOPO moieties, comprising the following steps:
    installing a mechanical agitator, an h-shaped oil-water separator, a reflux condenser pipe, a dropping funnel and a nitrogen gas inlet are installed on a 3 L four-neck flask,
    adding 253.3 g (1.172 mol) of DOPO which is 10-dihydro-9-oxa-10-phosphaphenanthrene-10-oxide, 100.6 g of paraxylene, 800 g of 1,1-dual(3,4-dimethyl phenyl)ethane solvents and 56.45 g of a reaction mixture of pentaerythritol and sodium iodide to the flask, wherein 53.13 g of pentaerythritol is dissolved in 160 ml of ethyl alcohol, and 2.55 g of sodium iodide is added to the ethyl alcohol, then mixture is heated for 2 hours, and then the ethyl alcohol is evaporated gradually to obtain the reaction mixture of the pentaerythritol and the sodium iodide,
    after the paraxylene is added to the oil-water separator fully, heating reaction mixture to 200° C. and reacting for 14 hours under protection of nitrogen flow, wherein the oil-water separator continuously discharges water produced in reaction process,
    upon completion of reaction, after system temperature decreases to a room temperature, adding 150 ml of pyridine, and then adding 29.94 g of phosphorus oxychloride with a dropping funnel dropwise, wherein hydrogen chloride gas generated in reaction is neutralized and absorbed by 20% NaOH solutions,
    after the phosphorus oxychloride is added, increasing reaction temperature to 60° C. and then reacting for 2 hours,
    wherein, after reaction mixture is cooled to the room temperature, a product P3 is precipitate out, which is the composite phosphorus flame retardant comprising cyclic organophosphate with multiple DOPO moieties.

* * * * *